United States Patent
Qi et al.

(10) Patent No.: US 8,802,175 B2
(45) Date of Patent: Aug. 12, 2014

(54) QUICK COOKING BARLEY AND PROCESS

(75) Inventors: Hong Qi, Edmonton (CA); Constance Mary Phillips, Devon (CA); Marshall Vance Eliason, Edmonton (CA); Marvin Nakonechny, Edmonton (CA)

(73) Assignee: Progressive Foods Inc., Edmonton, Alberta (CA)

( * ) Notice: Subject to any disclaimer, the term of this patent is extended or adjusted under 35 U.S.C. 154(b) by 109 days.

(21) Appl. No.: 13/001,105

(22) PCT Filed: Jun. 23, 2009

(86) PCT No.: PCT/CA2009/000863
§ 371 (c)(1),
(2), (4) Date: Jun. 7, 2011

(87) PCT Pub. No.: WO2009/155694
PCT Pub. Date: Dec. 30, 2009

(65) Prior Publication Data
US 2012/0058243 A1  Mar. 8, 2012

Related U.S. Application Data

(60) Provisional application No. 61/075,622, filed on Jun. 25, 2008.

(51) Int. Cl.
*A23L 1/10* (2006.01)
*A23L 1/00* (2006.01)

(52) U.S. Cl.
USPC ............ 426/462; 426/459; 426/463; 426/618

(58) Field of Classification Search
USPC .................. 426/618, 463, 459, 462
See application file for complete search history.

(56) References Cited

U.S. PATENT DOCUMENTS

| | | | |
|---|---|---|---|
| 3,189,462 A * | 6/1965 | Autrey et al. | 426/462 |
| 3,576,645 A * | 4/1971 | Rozsa | 426/13 |
| 5,464,647 A | 11/1995 | Messick | |
| 6,387,435 B1 | 5/2002 | Fox | |
| 2005/0025867 A1 | 2/2005 | Ames et al. | |

FOREIGN PATENT DOCUMENTS

GB    771 378    4/1957

OTHER PUBLICATIONS

Qi et al., "Process Development for Quick Cooking Barley Products," Sep. 2006, retrieved from the Internet http://web.archive.org/web/20060923170510/http://wheat.pw.usda.gov/ggpages/BarleyNewsletter/48/05_NABRW_POSTERabstracts.pdf.*
International Preliminary Report on Patentability (PCT/IB/326) and Written Opinion (PCT/ISA/237), 7 Pages.
European Search Report (EPO Form 1507S), 9 Pages.

* cited by examiner

*Primary Examiner* — Humera Sheikh
*Assistant Examiner* — Tynesha McClain-Coleman
(74) *Attorney, Agent, or Firm* — Marsh Fischmann & Breyfogle LLP; Jonathon A. Szumny (57) ABSTRACT

A method for processing barley to make a quick-cooking barley product is described. Barley is pearled to remove hulls, and is then precooked to raise the moisture content and gelatinize starch in a single step. The precooked barley is dried in two stages. The first drying stage causes case hardening of the kernel, while the second stage heats moisture trapped within the kernel to cause steam expulsion from the hardened kernel and final drying of the precooked barley. The resulting dried product is a porous kernel that may be shipped, stored, and easily reconstituted by the end user.

12 Claims, 8 Drawing Sheets

Figure 1

Figure 2. Moisture Content vs Soaking Time at Room Temperature and 50 °C
( 5% pearled Falcon)

Figure 3. Moisture content vs soaking time at room temperature
( 35% pearled Falcon)

Figure 4. Moisture Content vs Soaking Time at Boiling Temperature (5% pearled Falcon)

Figure 5. Moisture content vs soaking time at boiling temperature (35 % pearled Falcon)

Figure 6. Moisture content vs soaking time for water soaking (1 hr) at room temp followed by boiling and boiling treatments (5% pearled Falcon)

Figure 7. Moisture content vs time between boiling and soaking (1 hr) at room temp followed by boiling treatments (35 % pearled Falcon)

Figure 8. Moisture content vs time for boiling (10min) followed by water soaking and water soaking at room temperature (5% pearled Falcon)

Figure 9. Moisture content vs time between boiling and boiling (10 min) followed by soaking at room temperature (35 % pearled Falcon)

Figure 10. Moisture content vs time between stovetop boiling treatment and microwave cooking treatment (5% pearled Falcon)

Figure 11. Moisture content vs time between atmosphere pressure and pressure cooking treatments (5% pearled Falcon)

Figure 12. Moisture content vs time bewteen atmosphere pressure and pressure cooking (20 psi) treatments (35% pearled Falcon)

Figure 13. A typical force-deformation curve for the extrusion test.

QUICK COOKING BARLEY AND PROCESS

FIELD OF THE INVENTION

The present invention relates generally to the processing and preparation of barley for human consumption. More particularly, the present invention relates to a process for commercial precooking and drying of barley, resulting in a quick-cooking barley product.

BACKGROUND OF THE INVENTION

Barley is among the most ancient of the cereal crops. Barley is low in fat and is an excellent source of dietary fibre, containing beta-glucans, B-complex vitamins, vitamin E, tocopherols, and tocotrienols. Moreover, beta-glucan has been proven to reduce cholesterol and regulate blood glucose levels.

Currently, the majority of barley grown in North America is used as feed for cattle, swine, and poultry. Approximately one third of the barley supply is used for brewing malt beverages, and a very limited amount is marketed for general human consumption. Commercially available barley products include pot and pearled barley, grits, flakes, and malt flour. Cracked barley and barley flour can be incorporated into breads, and hulled barley may be used in hot breakfast cereals. However, the lengthy cooking time required (approximately one hour) has hindered wide acceptance of such products. Further, although whole grain products are currently desirable in the marketplace, the lengthy soak (several hours) required prior to cooking whole grain hulless barley has limited the marketing and use of this healthy grain.

With respect to processing of barley, traditional processing techniques include: blocking (dehulling), pearling, flaking, and milling. Blocking and pearling processes both remove the hull of the barley grain, however blocking removes part of the hull with minimum damage to the kernel, while pearling is an abrasive scouring process that gradually removes hull, bran, and germ. Pearling is usually carried out in two stages; the first stage removes only the loose hull (7 to 14% of the kernel removed) to produce pot barley. Further abrasion during the second stage of pearling removes the seed coat, aleurone, subaleurone layers, and the germ, producing a polished grain containing mainly starch, beta-glucan and protein. Pearled barley therefore includes only a fraction of the original whole grain, and excessive pearling results in a corresponding reduction in nutritional value. Pearled barley is currently used in soups, stews, salads, and as a rice extender, although the crease visible in the barley kernel easily distinguishes the barley from the rice in such mixtures.

It has been reported that barley pearling rates of 30 to 40% are optimum to retain maximum levels of soluble dietary fiber and beta-glucan (Pederson et al, *World Rev. Nutr. Diet.*, 60:1, 1989). It is further known that varying degrees and methods of barley processing will produce fractions that vary widely in physical and chemical composition.

Barley bran (excluding the hull) consists of testa and pericarp, germ, the tricellular aleurone, and the subaleurone layers. Barley, unlike wheat and oat, is a difficult grain to roller-mill into flour. Barley bran is brittle and has a tendency to shatter regardless of tempering conditions. Further, as barley is a soft grain, barley flour tends to be sticky and may be difficult to work with. It has been determined that 25 to 30% of the outer grain coverings may approximate bran and allow flour yields of 70 to 75%.

Due in part to the favorable nutritional profile of barley, there is a desire to increase the market acceptance of barley products. Two major market opportunities are the hot breakfast cereal market and the rice replacement market. However, the largest hurdles to consumer acceptance are the lengthy soaking and cooking times required. A quick-cooking barley product with favorable nutritional profile is desirable.

Although there has been great effort in rice processing research over the last four decades, there is still active interest in developing new and improved quick-cooking rice products and alternatives. Moreover, rice processes are not directly applicable to barley, as the structure and substance of the grain differs significantly from rice.

In U.S. Pat. No. 2,890,957 and No. 2,944,904, Seltzer describes a quick-cooking process for barley or rice. Barley or rice grains are soaked in water to hydrate without gelatinizing, steamed under pressure to gelatinize, compressed and finally dried. Barley prepared in this manner appears physically deformed due to the compression step.

Alternatively, U.S. Pat. No. 3,495,989, describes a process for the preparation of barley and a wide variety of other quick-cooking foods. The process entails soaking the barley in saline solution, tempering, gelatinizing in hot air, packaging and pasteurizing. The product has higher moisture content than the unprocessed grain and requires vacuum packaging.

U.S. Pat. No. 4,707,371 describes a process for the preparation of microwavable barley by utilizing pressure-cooking as a first gelatinizing step, soaking for a period of time, and drying over a period of 90 min.

A further process is described in U.S. Pat. No. 5,464,647. A quick-cooking barley product is produced by: cooking pearled barley to raise the moisture content of the barley to 55 to 65%; subjecting the barley to an atmosphere of pressure with saturated steam, while spraying hot water onto the barley in order to obtain a drained moisture of 70%-80%; draining; and drying to a moisture content of about 12% or less.

SUMMARY OF THE INVENTION

In one aspect, there is provided a method for processing barley to produce a precooked, dried barley product, the method comprising the steps of: pearling raw barley; soaking and precooking the barley in a single step to gelatinize starch within the barley kernel and raise moisture content of the barley to at least 60%; drying the precooked barley at a first temperature of greater than about 160° C. until case hardening of the barley kernel is achieved; and drying the case hardened barley at a second temperature less than or about 140° C.

In an embodiment, the barley is a hulled or hulless variety.

In an embodiment, the end product of the pearling step is dehulled barley.

In an embodiment, the pearling step scarifies the barley seed coat.

In an embodiment, the pearling step achieves a pearling rate of 5-35% by weight.

In an embodiment, the step of soaking and precooking the barley is achieved by pressure cooking.

In an embodiment, the step of soaking and precooking the barley is achieved by steam cooking.

In an embodiment, the step of soaking and precooking the barley is achieved by boiling.

In an embodiment, the step of soaking and precooking the barley includes raising the moisture content of the barley to 70%.

In an embodiment, the step of drying at the second temperature is terminated when the barley has a moisture content of less than 10%.

In accordance with a second aspect, there is provided a quick cooking barley product. The product may be made by any of the methods discussed herein.

In an embodiment, there is provided a barley product having a bulk density of between 500-600 kg/m$^3$, and a moisture content of less than 10%, which is reconstituted by boiling in water for less than about 20 minutes to produce a cooked barley product similar in texture and appearance to that of dehulled, unprocessed cooked barley of the same variety.

BRIEF DESCRIPTION OF THE DRAWINGS

Embodiments of the present invention will now be described, by way of example only, with reference to the attached Figures, wherein.

DETAILED DESCRIPTION

Generally, the present invention provides quick-cooking barley and a process to make quick-cooking barley. The quick cooking barley produced by the below-described method maintains its original shape (ie. no flaking or rolling of the kernel), as it is not physically deformed during the process. The resulting product has a bulk density between 480-530 kg/m$^3$. Once reconstituted by the end user, the cooked barley has a similar texture, taste, and appearance to that of long-cooking barley.

The process need not change the nutritional, chemical, and physical characteristics of the barley, and there are no significant differences between the quick cooking barley and regular, long cooking barley in acceptance, appearance, flavour, or texture. Consumer testing results show that a suitable, commercially acceptable product may be made using the below-described methods.

Overview

Figure 1:
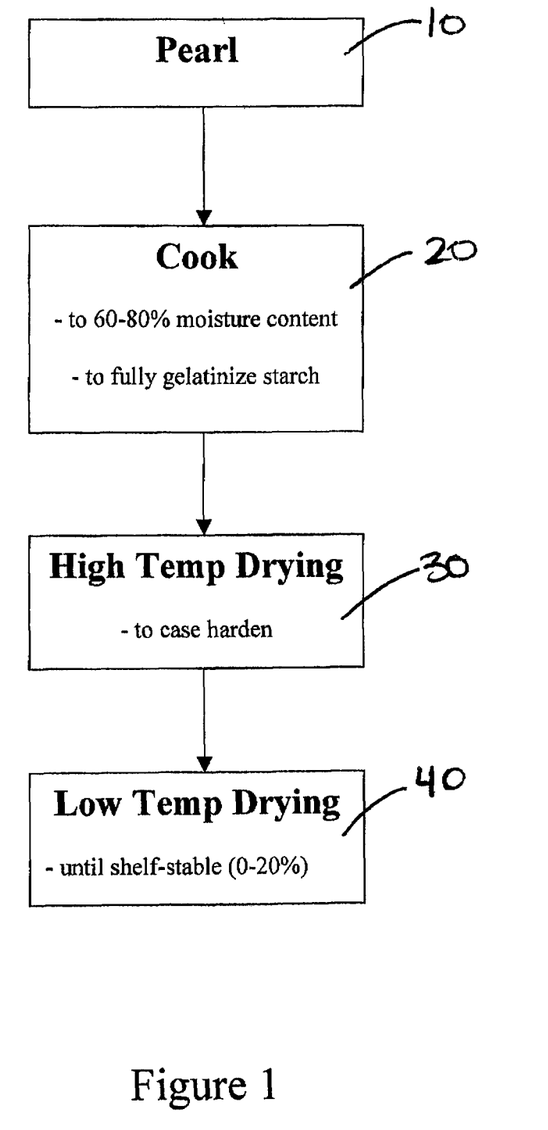
FIG. 1 is a schematic diagram depicting the process for making quick-cooking barley in one embodiment.

With reference to FIG. 1, whole grain barley is first pearled 10 remove the hull from the kernel (whether hulled or hulless).

The pearled barley is cooked 20 in the presence of moisture to raise the moisture content of the barley and to gelatinize starch within the barley kernel.

The cooked barley is dried in two stages. The first stage of drying is a high temperature drying step 30 to case harden the barley kernels. The second drying step 40 causes further heating and drying of the hardened kernel until the barley is sufficiently dried for storage. Separation methods may be used during drying to prevent clumping of the barley. A loose precooked barley product results, that requires only minimal cooking/rehydrating by the end user.

Each step in the process is described in greater detail below.

Pearling

Pearling is an abrasive scouring process that gradually removes hull, bran, and germ. In general, 5% pearling removes the hulls and part of the endosperm. Further abrasion (35% pearling) removes the seed coat (testa and pericarp), aleurone, subaleurone layers, and the germ. Kernels pearled by 5% still have a seed coat, which acts as a barrier to water penetration, resulting in slower moisture uptake. Kernels pearled by 35% have no hull and seed coat, thus the endosperm can more readily absorb moisture.

With reference to the process depicted in FIG. 1, Barley is first pearled to remove the hull. Suitable degrees of pearling by weight would generally range from about 5-35%. As hulless barley may contain some hulls, and as the degree of hull adherence to the kernel is affected by growing and harvesting conditions, the degree of pearling may vary from one barley bushel or batch to the next. It will be readily apparent to a operator monitoring the pearling process when sufficient pearling has been achieved to fully remove the hulls. Although complete hull removal is not required for barley processing, it is desirable for marketing of a barley product for human consumption as the hull is generally considered unpalateable.

In addition, the pearling step serves to scarify, or abrade, the barley seed coat. This scarification faciliates moisture penetration into the kernel during the subsequent processing steps.

While the barley is preferably pearled at least to the stage of hull removal and to scarify the seed coat, excessive pearling is undesirable as the seed coat (and bran) may be compromised or removed, sacrificing nutritional value in the end product. Further, excessive pearling may compromise the shape and integrity of the kernel in the end product.

Generally, testing to date has shown that 16-35% pearling is suitable for hulled varieties, while 5-35% pearling is suitable for hulless varieties. It is preferable to pearl minimally (at the lower end of the above-noted ranges) as long as the pearling is sufficient to fully remove the hull from the kernel.

Example: Cultivars used during testing included hulless Falcon, hulled AC Metcalfe, and waxy CDC-Candle. Pearling of 5 to 35% was achieved during testing through use of an abrasive disc dehuller set at 60 Hz for 2.5 to 22 minutes. AC Metcalfe was exposed to higher rates of pearling than hulless Falcon, to ensure hull removal.

Cooking and Soaking

As indicated in FIG. 1, following pearling the barley is cooked to increase the moisture content and gelatinize starch within the kernel. Testing has shown that cooking to a moisture content between 60-80% produces a suitable product, while cooking to 65-70% moisture content is preferred. Excessive cooking produces a viscous, sticky mass, while undercooking results in a product with hard, ungelatinized centres. The moisture content achieved during cooking correlates generally with the degree of cooking required by the end user to reconstitute the quick-cooking product. For example, it is expected that a batch of barley cooked to a moisture content 80% that is subsequently dried in accordance with the method described herein will require a cook/reconstitution time by the end user of approximately 5 minutes. Similarly, cooking to 60% moisture may result in an end cook time of 20 minutes.

Examples of cooking methods, moisture content, and resulting product suitability are provided below.

Soaking or Boiling

With reference to FIGS. 2 through 10, water soaking of barley samples was conducted at temperatures of 20° C., 50° C. and 100° C. Approximately 200 g of 5% or 35% pearled Falcon were immersed in a sufficient amount of water in a beaker. A sample of about 10 g was removed every minute from boiling water and every hour from 20° C. and 50° C. soaking solutions. The samples were blotted with paper towel to remove excess moisture and moisture content was determined. The samples were also left in the soaking solution at room temperature for 24 hr to determine equilibrium moisture content. Two combinations of soaking treatments, soaking at room temperature (20° C.) for 1 hr followed by boiling and boiling for 10 min followed by soaking at room temperature (20° C.) were also tested.

Figure 2:
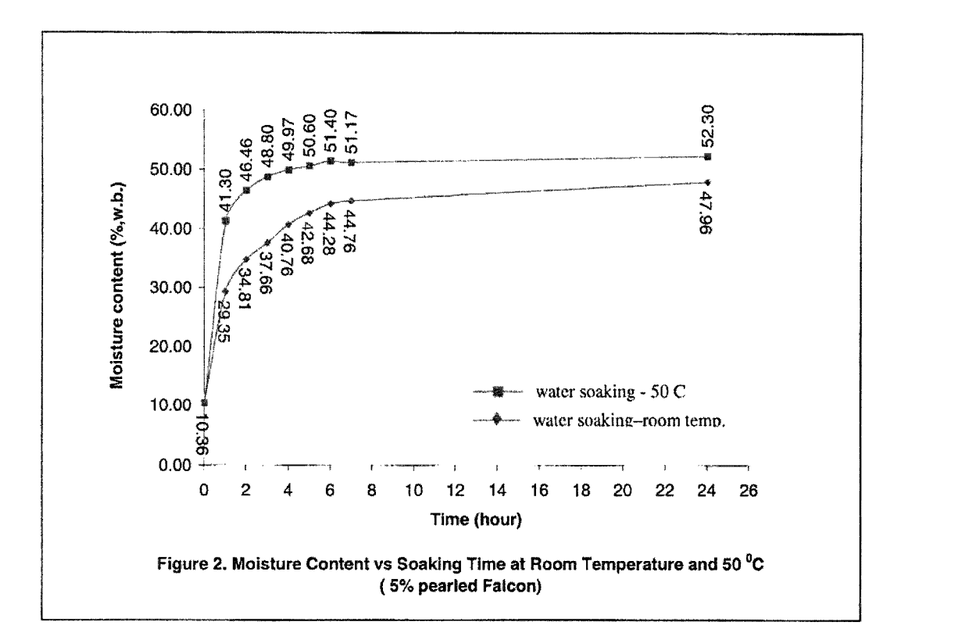
FIG. 2 is a graph showing moisture content of 5% pearled Falcon when soaked at room temperature and at 50° C.
Figure 3:
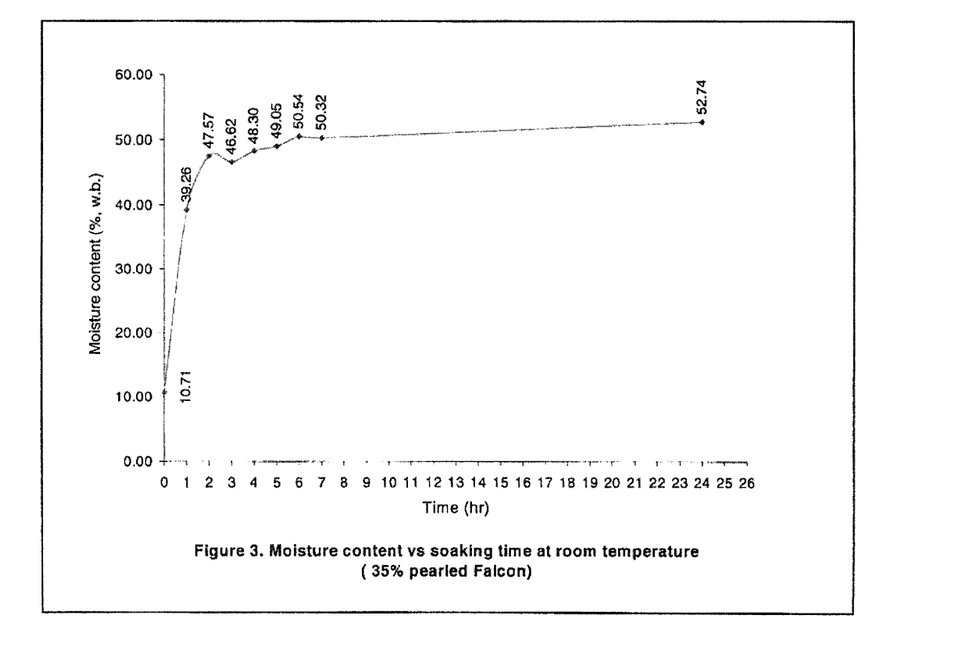
FIG. 3 is a graph showing moisture content of 35% pearled Falcon when soaked at room temperature.
Figure 4:
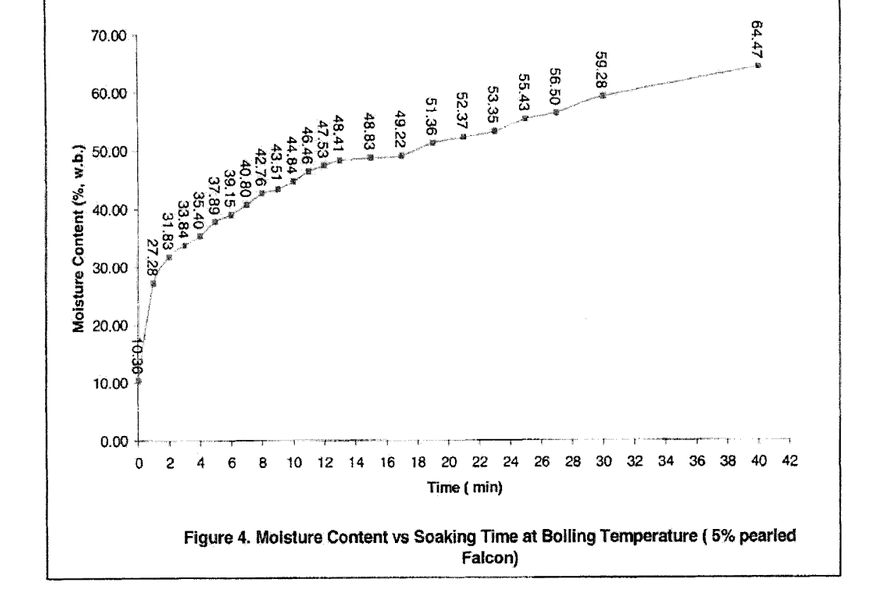
FIG. 4 is a graph showing moisture content of 5% pearled Falcon when soaked at boiling temperature.
Figure 5:
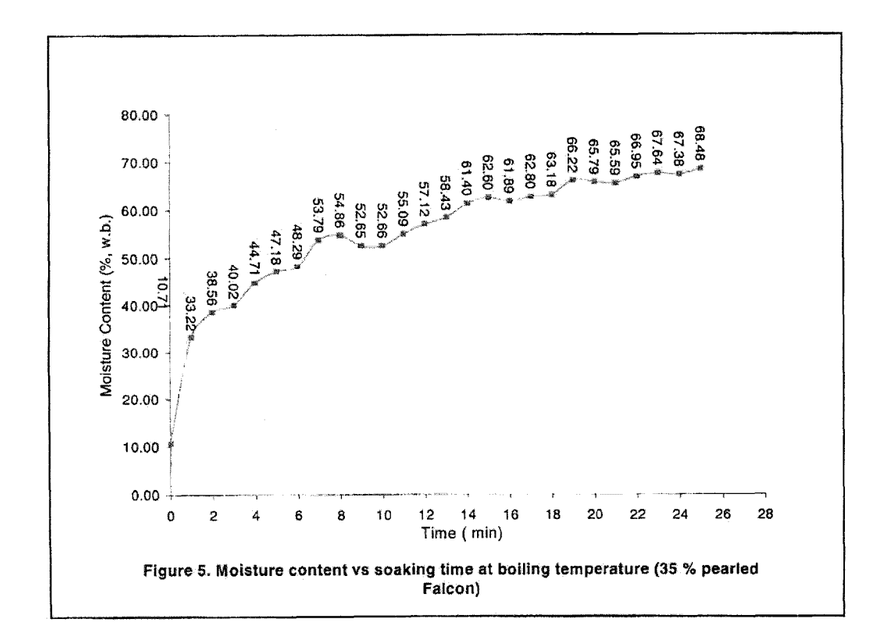
FIG. 5 is a graph showing moisture content of 35% pearled Falcon when soaked at boiling temperature.

With reference to FIG. 2, the moisture content of 5% pearled Falcon increased more rapidly, and equilibrated at higher moisture content when soaked at 50° C. than at room temperature. With reference to FIG. 3, 35% pearled Falcon gained moisture rapidly during the first two hours of soaking at 50° C. and equilibrated at 52.74% moisture content. As shown in FIGS. 4 and 5, both 5% and 35% pearled Falcon absorbed more moisture (64.47% and 68.48% moisture content, respectively) and reached high levels of moisture content more quickly when soaked in boiling water than when soaked in water at room temperature or 50° C. Further, in boiling water, 35% pearled Falcon absorbed moisture more quickly than 5% pearled Falcon, due to the absence of the hull and seed coat.

Notably, with reference to FIG. 2, 5% pearled Falcon soaked at room temperature reached only 47.96% moisture content, while the 5% Falcon soaked in boiling water reached 47.53% in only 12 minutes. Samples taken at this moisture content were observed to have a white centre, indicating incomplete gelatinization.

Combination Soaking and Boiling

Figure 6:
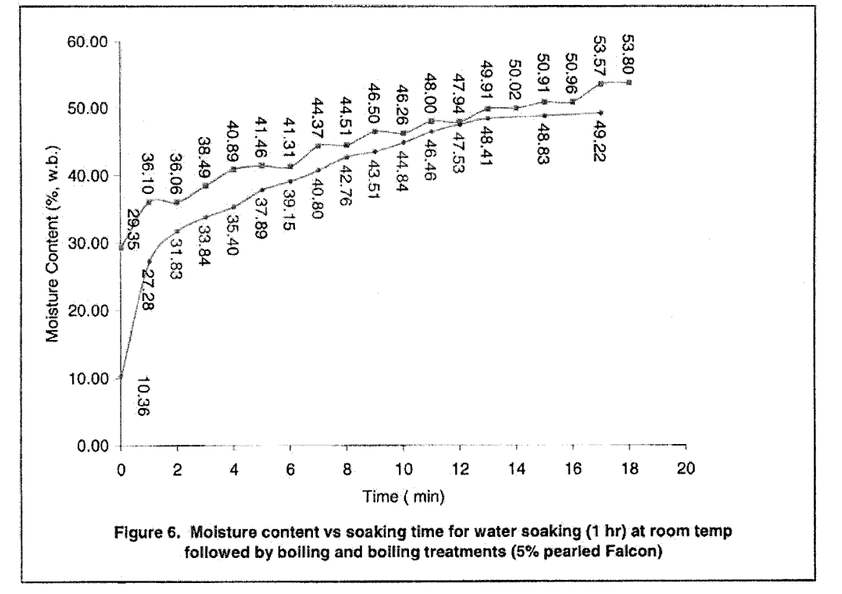
FIG. 6 is a graph showing moisture content of 5% pearled Falcon when presoaked at room temperature followed by boiling treatment compared to boiling without presoaking.

As room temperature soaking and soaking at 50° C. did not result in incomplete gelatinization of starch within the barley kernel, a combination treatment (one hour room temperature soaking followed by 15 minute boiling) was tested. Such combination treatments have been used in the processing of quick-cooking rice. However, the barley samples did not respond to the combination treatment in a similar manner to the results reported for rice. Specifically, as shown in FIG. 6, the 5% pearled barley kernels gained 29.35% moisture after 1 h soaking, which is a similar moisture content to that of rice following the same treatment. However, after boiling for 15 min the barley sample moisture content increased only to 50.91%, which is lower than the reported moisture level of 65-70% for rice.

Figure 7:
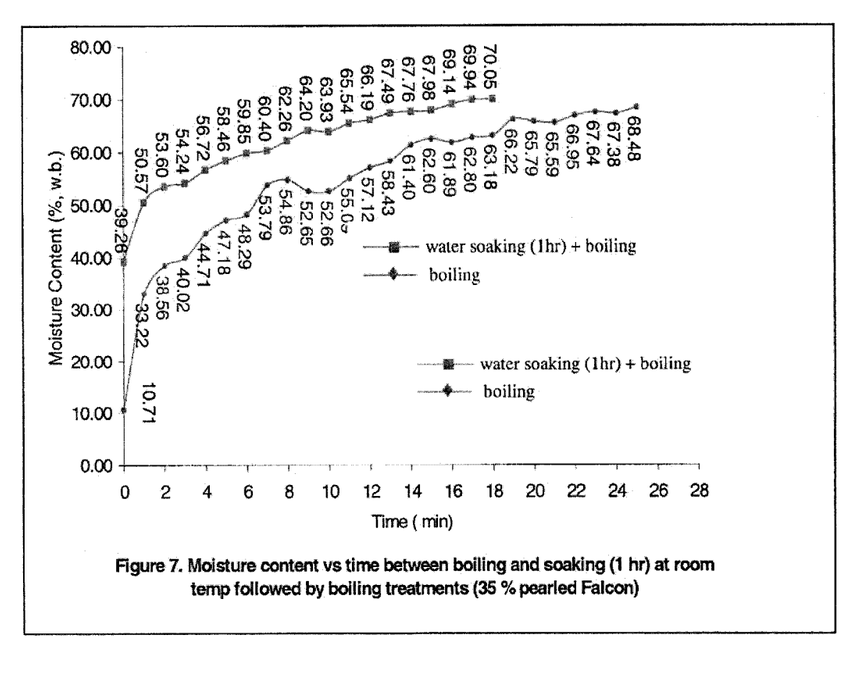
FIG. 7 is a graph showing moisture content of 35% pearled Falcon when presoaked at room temperature followed by boiling treatment compared to boiling without presoaking.

With reference to FIG. 7, 35% pearled Falcon reached 39.26% after one hour of soaking at room temperature, which is a higher initial moisture content than reported in rice. The moisture content after 18 minutes of subsequent boiling was 70.05%, compared with a moisture content of only 63.18% when boiling unsoaked 35% pearled Falcon for 18 minutes.

Figure 8:
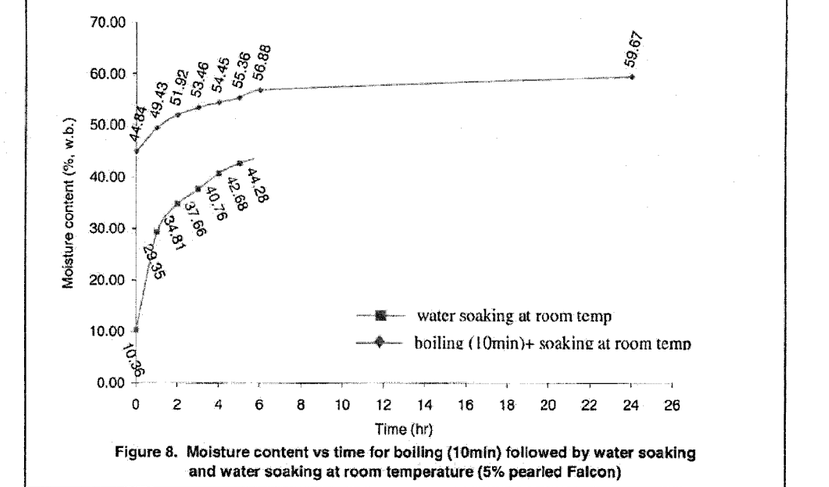
FIG. 8 is a graph showing moisture content of 5% pearled Falcon when presoaked in boiling water followed by soaking at room temperature compared to soaking at room temperature alone.
Figure 9:
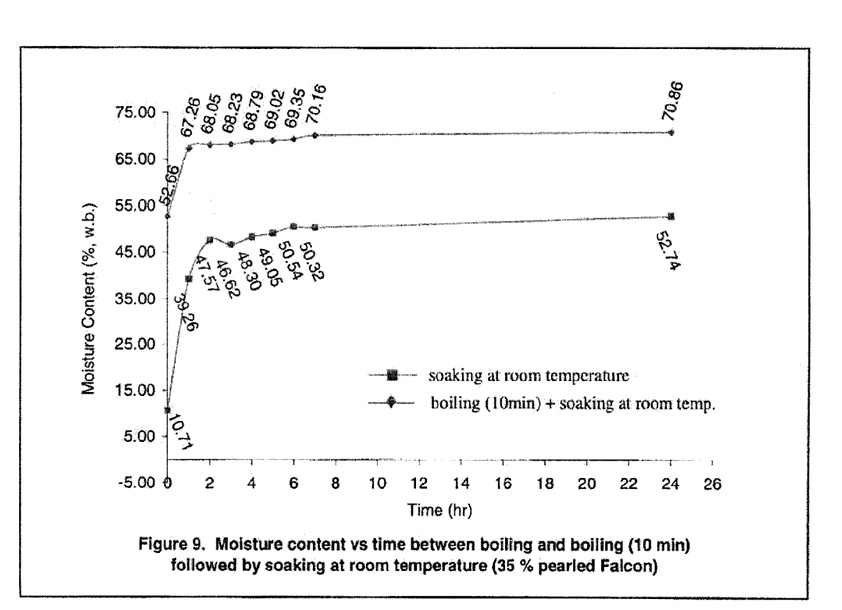
FIG. 9 is a graph showing moisture content of 35% pearled Falcon when presoaked in boiling water followed by soaking at room temperature compared to soaking at room temperature alone.

A further combination treatment (10 minute boil followed by soaking) was also tested, with results shown in FIGS. 8 and 9. The moisture content attained following the 10 minute boil was 44.84% for 5% pearled Falcon, and 52.66% for 35% pearled Falcon. The subsequent soak in room temperature water resulted in a higher moisture content in 35% pearled Falcon than in 5% pearled Falcon and the difference in final moisture content between the combination treatment vs. room temperature soak was more substantial for 35% pearled Falcon that for 5% pearled Falcon.

Steam Exposure

A preconditioner (Wenger Manufacturing Inc, Kansas, USA) equipped with a 10 hp low-pressure steam boiler was used for the direct steam cooking experiments. The mixing paddles in the pre-conditioner rotated at 150 rpm. The average steam flow rate was about 130 kg/hr. Cooking times ranged from 30 to 40 minutes for the 35% pearled barley and from 45 minutes to 1 hour for the 5% and 16% pearled barley samples.

The process conditions, batch size, cooking time, steam flow-rate and pre-treatments that were tested in the direct steam cooking treatments are presented in Table 1. Moisture content was measured and used to evaluate the parameters. Due to the size of the steam chamber, 2.5 kg batch sizes were used with a 136 kg/hr steam flow-rate.

For steaming following presoak, pearled barley was pre-soaked at room temperature for about 30 to 60 min to about 30% moisture; further cooked using steam for 40 min to 1 h to increase the moisture content to 60 to 70%; and dried with hot air at a temperature of 160° C. to 170° C. for 10 to 50 min depending on the dryer type (to about 8 to 10% moisture). This process resulted in a product with a porous structure and a bulk density ranging from 460 to 550 kg/m³.

The results showed that the pre-soaking before steaming treatment increases the moisture uptake for all varieties and the two pearling levels. For 5% pearled Falcon, pre-soaking for 1 h, and steaming for 60 min was most suitable, with average moisture content of 70.45%. For 35% pearled Falcon, pre-soaking for 30 min, and steaming for 40 min increased the moisture content to 67.24%. For 16% pearled AC-Metcalfe, pre-soaking for 1 h, steaming for 45 min resulted in a moisture level of 68.18% and for 35% pearled AC Metcalfe, pre-soaking for 1 hr and steaming for 30 min resulted in a moisture level of 67.23%.

TABLE 1

Process conditions for steam cooking treatment

| Barley Samples | Batch (Kg) | Pre-treatment | Mixing speed (rpm) | Steam flow rate (kg/hr) | Cooking Time (min) | Moisture Content (%) | Drying* | Comments |
|---|---|---|---|---|---|---|---|---|
| 5% pearled Falcon | 5 | No | 150 | 65.5 | 35 | 43.00 | 15 min at 170° C. | Many hard centers |

TABLE 1-continued

Process conditions for steam cooking treatment

| Barley Samples | Batch (Kg) | Pre-treatment | Mixing speed (rpm) | Steam flow rate (kg/hr) | Cooking Time (min) | Moisture Content (%) | Drying* | Comments |
|---|---|---|---|---|---|---|---|---|
| 5% pearled Falcon | 2.5 | Pre-water rinse | 150 | 136 | 60 | 64.01 | 15 min at 165° C. | Slightly hard |
| 5% pearled Falcon | 2.5 | Pre-soaking For 1 hr (33.99%) | 150 | 136 | 60 | 68.24 | 10 min at 155° C. | Good |
| 5% pearled Falcon | 2.5 | Pre-soaking 1 hr (36.1% moisture) | 150 | 136 | 30 | 58.16 | 15 min at 165° C. | Somehow hard kernels, no hard center |
| 5% pearled Falcon | 2.5 | Pre-soaking for 1 hr (34.9%) | 150 | 136 | 60 | 74.65 | 10 min at 155° C. | Slightly lumpy, good |
| 35% pearled Falcon | 5 | No | 152 | 65.5 | 30 | 31.96 | 15 min at 170° C. | Many hard centers |
| 35% pearled Falcon | 5 | No | 152 | 136 | 40 | 33.17 | 15 min at 170° C. | Some hard centers |
| 35% pearled Falcon | 2.5 | Pre-water rinse | 150 | 136 | 30 | 60.02 | 10 min at 165° C. | Good |
| 35% pearled Falcon | 2.5 | Pre-soaking For 30 min (34.75%) | 150 | 136 | 40 | 67.24 | 10 min at 165° C. | Very good, not sticky |
| 35% pearled Falcon | 2.5 | Pre-soaking for 1 hr (39.25%) | 150 | 136 | 30 | 70.74 | 10 min at 155° C. | Fluffy, not sticky |
| 35% pearled AC-Metcalfe | 2.5 | Pre-soaking for 30 min (33.96%) | 150 | 136 | 30 | 68.18 | 10 min at 155° C. | Good |
| 16% pearled AC-Metcalfe | 2.5 | Pre-soaking for 1 hr (28.23%) | 150 | 136 | 45 | 67.23 | 10 min at 155° C. | Good |

*Drying was conducted using a Proctor and Schwartz Tray Dryer.

Microwave Cooking

Figure 10:
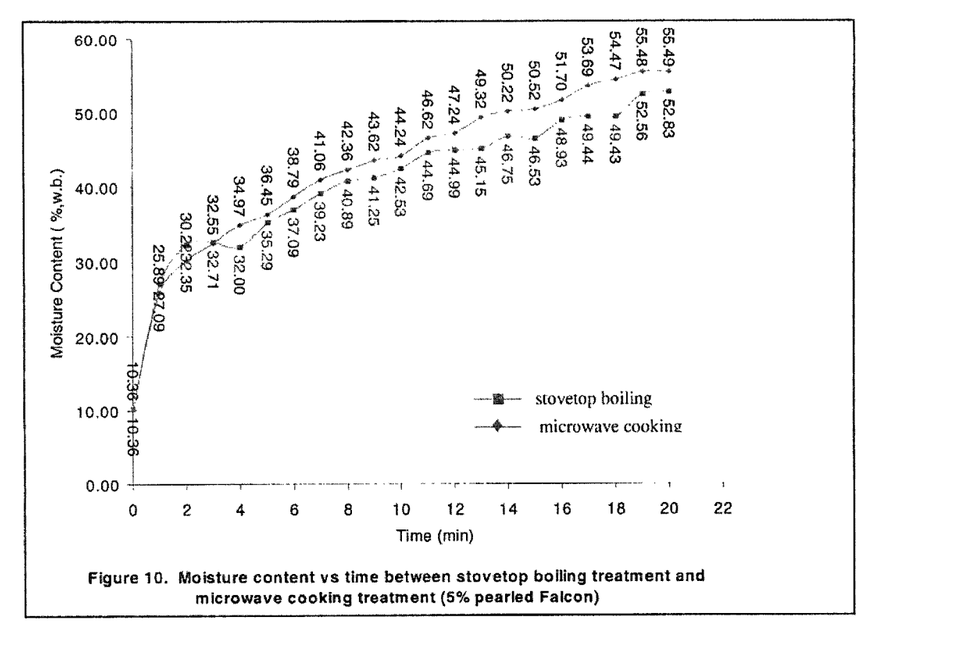
FIG. 10 is a graph showing moisture content of 5% pearled Falcon during stovetop cooking and microwave cooking.

Tests were performed using a microwave oven to cook barley. Approximately 100 g of 5% or 35% pearled Falcon were immersed with sufficient amount of water in a beaker and placed in the microwave. A sample of about 10 g was removed from the beaker every minute and moisture content was analyzed. FIG. 10 shows moisture uptake as a function of time for the 5% pearled Falcon using a microwave. Barley kernels treated with microwave cooking appeared to have a slightly higher water uptake than those treated with stovetop boiling (55.49% moisture compared with 52.83%).

Pressure Cooking

The pressure-cooking process used pearled barley that was rinsed and pressure-cooked with 2.5 times water by weight for 25 to 40 min. The temperature and time were adjusted depending on the processing equipment used. The pressure developed during the process was slowly reduced to atmospheric pressure to avoid puffing. The cooked barley absorbed most of the water, and had a moisture content generally ranging from 60 to 70%. The cooked barley was dried with hot air at a temperature of 160° C. to 170° C. for 10 to 50 min using the fluid bed or tray dryer (to about 8 to 10% moisture). The resulting product had a porous structure with an average bulk density of 530 kg/m$^3$.

Preliminary tests were performed under varying pressures and drying conditions. The most suitable cooking pressure and drying temperature tested were 20 psi and 165° C. Approximately 200 g of 5% or 35% pearled Falcon were immersed in a sufficient amount of water in an aluminum container and placed in an autoclave chamber (AMSCO, autoclave). The autoclave was operated at 20 psi (121° C.). The chamber was pressurized and held for 5, 10 or 15 minutes before depressurizing. The samples were then rinsed with cold water, blotted with paper towel to remove excess water and moisture contents determined.

A sampling of the tested sample types, cooking times and final moisture content under these conditions are listed in Table 2. Moisture uptake was used to optimize process conditions. Suitable cooking times for 5% and 35% pearled Falcon were 25 min and 20 min, respectively, which resulted in moisture contents of 71.91% and 72.23%, respectively. Under these conditions the barley kernels were fluffy, very well cooked but not sticky. Suitable cooking times for 16% pearled and 35% pearled AC Metcalfe were 25 min and 20 min, respectively, which resulted in moisture contents of 69.19% and 69.69%, respectively. The cooked barley kernels were fluffy and well cooked, but not sticky.

The pressure-cooking process for whole CDC-Candle (waxy type barley) was unfavorable. The barley kernels were mashed and sticky, and the seed coats were deformed. Water used in the pan for cooking was saturated with starchy material resembling porridge.

TABLE 2

Process conditions for autoclave pressure-cooking

| Barley | Temp/ pressure | Cooking time | Moisture Content (%) | Drying (Fluidized bed dryer) | Comments |
|---|---|---|---|---|---|
| 35% pearled Falcon | 121° C./ 20 psi | 15 | 72.64 | 25 min at 165° C. | slightly hard centre |
| 35% pearled Falcon | 121° C./ 20 psi | 20 | 72.23 | 25 min at 165° C. | good |
| 5% | 121° C./ | 25 | 71.91 | 50 min at | good |

TABLE 2-continued

Process conditions for autoclave pressure-cooking

| Barley | Temp/ pressure | Cooking time | Moisture Content (%) | Drying (Fluidized bed dryer) | Comments |
|---|---|---|---|---|---|
| pearled Falcon | 20 psi | | | 165° C. | |
| 16% pearled AC-Metcalfe | 121° C./ 20 psi | 25 | 69.19 | 50 min at 165° C. | very nice and soft |
| 35% pearled AC-Metcalfe | 121° C./ 20 psi | 20 | 69.69 | 40 min at 160° C. | good |
| Whole CDC-Candle | 121° C./ 20 psi | 25 | 65.17 | 60 min at 165° C. | very mushy and sticky |

Figure 11:
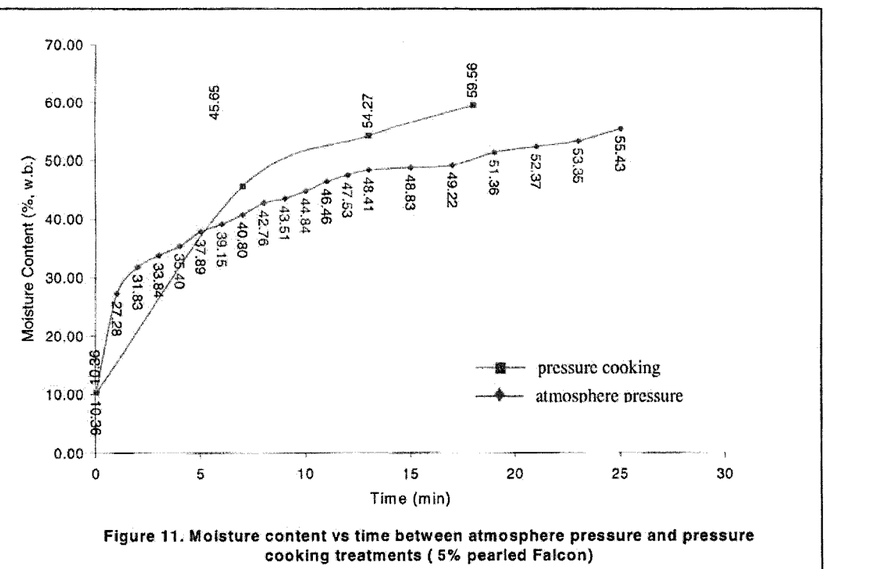
FIG. 11 is a graph showing moisture content of 5% pearled Falcon during cooking at atmospheric pressure and at 20 psi.
Figure 12:
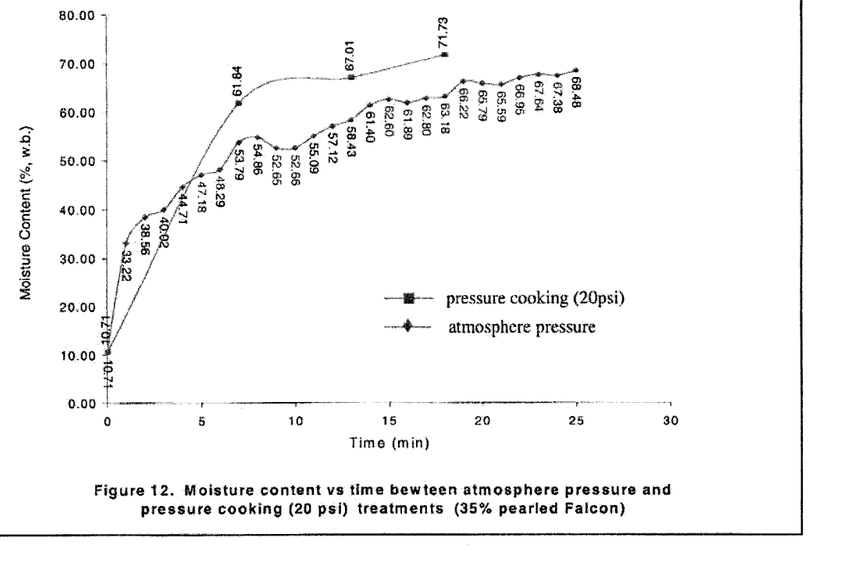
FIG. 12 is a graph showing moisture content of 35% pearled Falcon during cooking at atmospheric pressure and at 20 psi.

With reference to FIGS. 11 and 12, cooking in boiling water at atmospheric pressure is compared with pressure-cooking conditions (20 psi, 121° C.). Pressure cooking resulted in faster absorption of water and a higher final moisture content in both 5% and 35% pearled Falcon. However, a longer cooking time was again required for 5% Falcon than for 35% pearled Falcon.

The pressure-cooking process was scaled-up using a Hamilton Pressure Kettle (Trinity Industries Inc. Cincinnati, Ohio. 45241. USA). Ten kilograms of 5% and 35% pearled barley samples were rinsed to remove surface dust, then placed into a wire-meshed basket. The basket was put into the pressure kettle, sufficient water was added and the lid of the kettle was closed. Operating steam was applied. Kettle pressure was 10 psi at 115° C. Cooking time was approximately 13 min at 115° C. with an additional 7 min for pressure release. Total cooking time for the 5% pearled barley was 20 min. For the 35% pearled barley, cooking time was 8 minutes at 115° C. and 7 minutes for pressure release. Total cooking time for 35% pearled barley was 15 minutes. Resulting moisture content is shown in Table 3.

With respect to consumer tests of the end product, the pressure cooked barley produced more favorable scores than the steam cooked barley in the texture and stickiness categories. However, the steamed barley produced higher consumer test scores for appearance and colour.

TABLE 3

Processing conditions for pressure-cooking using a Hamilton pressure kettle

| Barley | Temp/ pressure | Cooking time | Moisture Content (%) | Baxter Oven Dryer |
|---|---|---|---|---|
| 35% pearled Falcon | 115° C./ 10 psi | 16 | 72.17 | 50 min at 160° C. |
| 5% pearled Falcon | 115° C./ 10 psi | 20 | 70.42 | 45 min at 155° C. |
| 16% pearled AC Metcalfe | 115° C./ 10 psi | 15 | 68.61 | 45 min at 155° C. |
| 35% pearled Falcon | 115° C./ 10 psi | 16 | 74.97 | 50 min at 160° C. |

Drying

With reference to FIG. 1, the cooked barley is dried in two stages. The moist, cooked barley is first dried at high temperature (flash drying) to case harden the kernels. Once case hardened, the remaining moisture is trapped within the kernel and continues to heat. During this high temperature drying phase, care should be taken to avoid burning the barley. Thus, this initial drying stage is conducted at sufficient temperature and for a suitable time to at least case harden the kernel and at most, roast the kernel without burning. Generally, suitable temperatures range from about 160-200° C., and suitable drying times at these temperatures would be from about 8 to 20 minutes. Moisture content of the barley following the first drying stage would be expected to be from about 20% to 40%.

The second drying stage occurs at a lower temperature suitable to dry the kernel for storage and shipping to the end user. The resulting product is a dehydrated, reconstitutable product that is handled and reconstituted in similar manner to quick-cooking oats or quick-cooking rice, that would require a cook/reconstitution time of 5 to 20 minutes. Generally, suitable final moisture content for the dried product would be between 8-12%, which may be shipped and stored at ambient temperature.

The second stage of drying is conducted at temperatures between about 120-140° C. These temperatures are high enough that moisture within the kernel continues to heat and vaporize until finally the pressure within the case hardened kernels causes steam to be expelled through the hardened outer crust. Notably, weak points in the outer crust are present due to the prior scarification of the barley during pearling. These weak points serve as steam ports or vents through which steam may escape, leaving a porous, dried grain.

During cooking of the barley, gelatinized starch may ooze from the kernels, causing a gluing effect that tends to cause clumping of the moist barley. As such, steps may be taken during cooking and drying to separate or prevent such clumps. This may include spraying with water, steam, or air; shaking or otherwise agitating the cooked barley; screening; or spreading out the cooked barley in a thin layer to minimize this gluing effect.

Examples: Drying of the cooked barley was conducted using a Niro Fluidized bed dryer, Proctor tray dryer and Baxter oven dryer. Drying temperatures and times ranged from 165° C. to 175° C. for 12 to 20 minutes.

Drying at temperatures between 160-170° C. for 10 to 50 minutes resulted in a final moisture content of 8-10%. The end product was porous, with a density of 530 kg/cubic meter.

Physical and Nutritional Analysis

Figure 13:
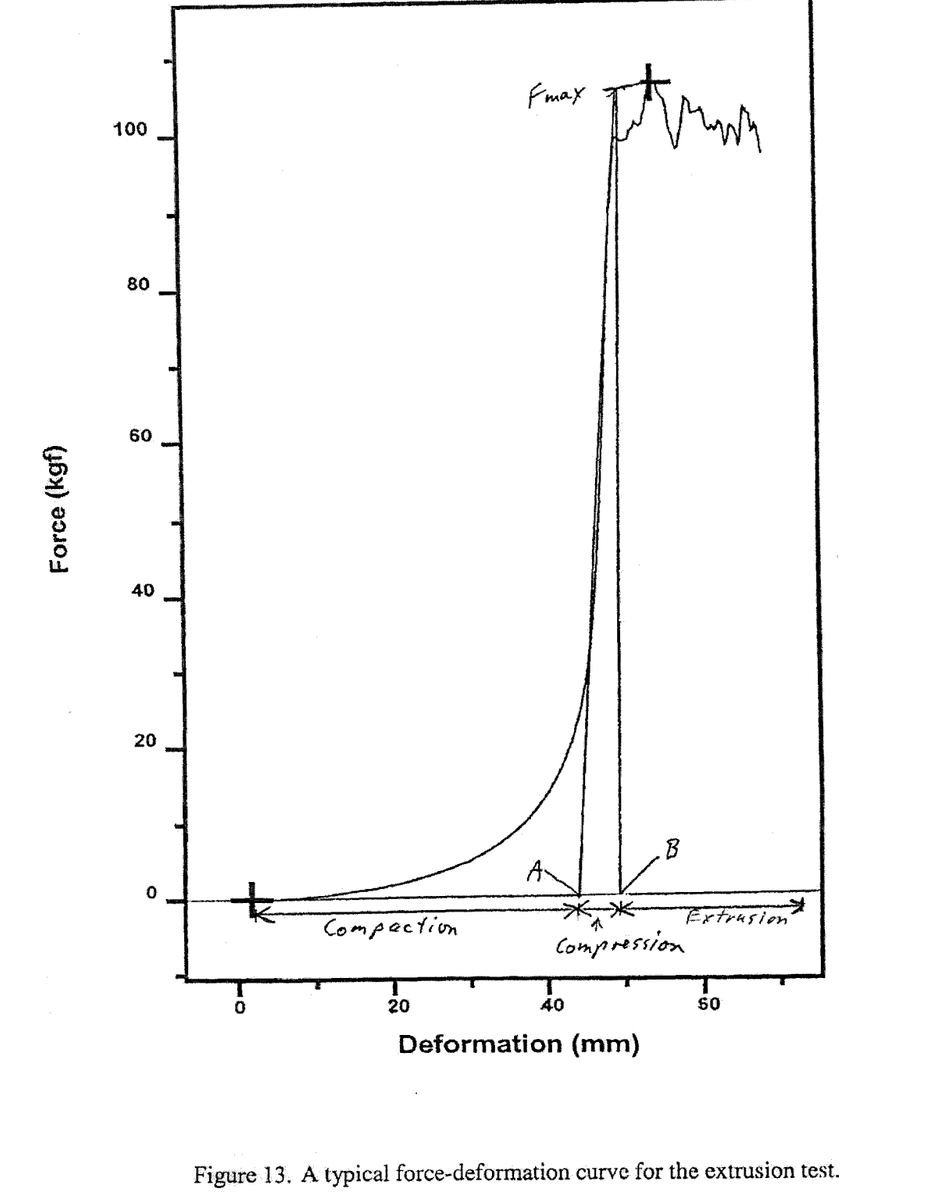
FIG. 13 is a graph showing the force and deformation during barley extrusion.

Cooked and uncooked barley was subjected to compression tests. The results of this testing are presented in Table 6. A typical force-deformation curve from one extrusion test is listed in FIG. 13. In the extrusion test, the force-deformation curve was divided into three phases: packing, compression, and extrusion. The packing phase started from the original position of the piston until it contacted the barley sample and packed it in the extrusion cell. The compression phase was defined as the phase during which the sample was compressed before being extruded. The extrusion phase was defined as the time during which the sample was being extruded through the extrusion plate holes. The maximum force (F) as extrusion phase started was used to measure the hardness. As expected, the untreated samples had the highest extrusion force (Newton) ranging from 1045.15 N for 5% pearled Falcon to 1050.95 N for the 16% pearled AC Metcalfe. Between two pearling levels, the 35% pearling rate had lower F values compared with the 5% pearling rate for both varieties. Pressure-cooked samples had lower F values than steam cooked samples, indicating that pressure-cooked samples are softer than the steam cooked.

TABLE 6

Texture measurement of maximum force for barley samples under different treatments

| Variety | A Treatments | F max (N) |
|---|---|---|
| Falcon | 5% pearled raw (cooked for 18 min before measurement) | 1045.15 ± 6.29 |
| | 35% pearled raw (cooked for 15 min before measurement) | 587.60 ± 33.51 |
| | 5% pearled steam treated (cooked for 18 min before measurement) | 673.00 ± 20.65 |
| | 35% pearled steam treated (cooked for 15 min before measurement) | 423.05 ± 10.54 |
| | 5% pearled pressure treated (cooked for 18 min before measurement) | 476.90 ± 30.41 |
| | 35% pearled pressure treated (cooked for 15 min before measurement) | 241.40 ± 11.03 |
| AC Metcalfe | 16% pearled raw (cooked for 18 min before measurement) | 1050.95 ± 0.64 |
| | 35% pearled raw (cooked for 15 min before measurement) | 665.00 ± 16.12 |
| | 16% pearled steam cooked (cooked for 18 min before measurement) | 534.90 ± 7.35 |
| | 35% pearled steam cooked (cooked for 15 min before measurement) | 408.75 ± 42.92 |
| | 16% pearled pressure cooked (cooked for 18 min before measurement) | 464.75 ± 24.82 |
| | 35% pearled pressure cooked (cooked for 15 min before measurement) | 404.85 ± 3.61 |

Compositional analysis results for moisture, protein, lipid, starch and beta-glucan are presented in Table 4. The moisture contents range from 6.65% to 8.74%. All of the pretreated samples had lower moisture contents than raw barley samples. The protein contents ranged from 10.66% to 11.33% for the 16% pearled AC Metcalfe compared with 9.04% to 9.95% for the 35% pearled AC Metcalfe. The protein contents ranged from 12.95% to 14.35% for the 5% pearled Falcon and 10.02% to 10.73% for the 35% pearled Falcon. Total starch contents increased with treatment. There was a slight decrease in beta-glucan content with the treatments except with the 35% pearled AC Metcalfe, where the beta-glucan level increased with treatment. In addition to the moisture, protein, lipid, starch and beta-glucan contents, the insoluble dietary fiber, soluble dietary fiber and total dietary fiber are presented in Table 4. As expected, the 5% pearled barley had a much higher insoluble dietary fiber content than that of the 35% pearled barley samples. Data shows that there is a slight increase in the soluble fibre content with the pressure treatment compared with the untreated barley samples.

The dried barley product resulting from the above methods may be prepared by the end user by stovetop cooking in at least twice the volume of water for between 5 and 20 minutes. A 5 minute stand may further provide suitable reconstitution of the barley prior to consumption.

The quick cooking barley products described herein have a cooked texture, as measured by an Ottawa extrusion method with an average force of 450 N, average bulk density of 530 kg/m$^3$ and appearance similar to long cooking barley (cooking 35% pearled for 45 min and 5% pearled for 1 h).

EXAMPLES

Generally, the quick-cooking barley produced using the methods described herein may be cooked on the stovetop by boiling in at least twice the volume of water for about 15 minutes followed by a 5-minute stand.

For 35% pearled Falcon, end user cook time (by stovetop boiling) was reduced from 45 minutes to 15 minutes. For 5% pearled Falcon, cook time was reduced from 60 minutes to 18 minutes. The cooked texture, as measured by extrusion, is approximately 480 N.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for processing barley to produce a quick-cooking, dried barley product consisting of:
   pearling raw barley at a pearling rate of approximately 5%-35%, to achieve scarification of the seed coat of the barley;
   precooking the pearled barley to gelatinize starch within the barley and raise moisture content of the barley to at least 60%;
   drying the precooked barley by heating same at a first temperature of approximately 160° C. to 200° C. until case hardening of the barley is achieved;
   continuing to dry the barely by heating the case hardened barley at a second temperature of approximately 120° C. to 40° C. until steam ports form in the case hardened barley.

2. The method as in claim 1 wherein the barley is a hulled or hulless variety.

TABLE 9

Nutritional analysis of barley samples

| Variety | Pearling/Cooking | Moisture % | Protein % | Lipid % | Starch % | Beta-glucan % | Insoluble Dietary Fiber % | Soluble Dietary Fiber % | Total Dietary Fiber % |
|---|---|---|---|---|---|---|---|---|---|
| AC Metcalfe | 16% pearled raw | 8.29 | 11.33 | 1.48 | 71.84 | 5.39 | 6.17 | 6.20 | 12.37 |
| | 16% pearled pressure cooked | 6.65 | 11.18 | 1.89 | 73.13 | 5.15 | 6.87 | 5.55 | 12.43 |
| | 16% steam cooked | 6.79 | 10.66 | 0.89 | 73.93 | 5.17 | 7.38 | 5.27 | 12.65 |
| | 35% pearled raw | 8.95 | 9.95 | 0.87 | 75.02 | 5.01 | 3.63 | 5.58 | 9.21 |
| | 35% pearled pressure cooked | 7.19 | 9.81 | 1.22 | 75.78 | 5.24 | 5.12 | 6.06 | 11.17 |
| | 35% steam cooked | 6.60 | 9.04 | 0.46 | 78.23 | 5.08 | 4.50 | 5.47 | 9.97 |
| Falcon | 5% pearled raw | 8.74 | 13.85 | 1.42 | 62.28 | 4.96 | 8.84 | 7.23 | 16.07 |
| | 5% pearled pressure cooked | 6.89 | 14.35 | 0.43 | 64.78 | 4.80 | 8.88 | 7.22 | 16.10 |
| | 5% steam cooked | 7.58 | 12.95 | 1.58 | 65.91 | 4.90 | 8.60 | 6.65 | 15.24 |
| | 35% pearled raw | 8.72 | 10.02 | 0.84 | 72.37 | 5.33 | 4.72 | 6.78 | 11.50 |
| | 35% pearled pressure cooked | 6.49 | 10.68 | 2.06 | 71.53 | 5.05 | 5.58 | 6.86 | 12.44 |
| | 35% steam cooked | 7.23 | 10.73 | 1.78 | 73.08 | 4.830 | 5.49 | 6.54 | 12.03 |

3. The method as in claim 1, wherein the pearling rate is approximately 5%.

4. The method as in claim 1, wherein the step of precooking the barley is achieved by pressure cooking.

5. The method as in claim 1, wherein the step of precooking the barley is achieved by steam cooking.

6. The method as in claim 1, wherein the step of precooking the barley is achieved by boiling.

7. The method as in claim 1, wherein the step of precooking the barley includes raising the moisture content of the barley to 70%.

8. The method as in claim 1, wherein the step of heating at the second temperature is terminated when the barley has a moisture content of less than 10%.

9. A barley product prepared by the method as in claim 1, wherein the product comprises a case hardened barley having steam ports formed in the hardened outer crust through which steam may escape during the step of heating at the second temperature, leaving a porous, dried grain.

10. The barley product of claim 9, having approximately 5% pearling.

11. The barley product of claim 9, having 5% pearling.

12. The barley product of claim 9, having a moisture content of less than 10%.

\* \* \* \* \*

UNITED STATES PATENT AND TRADEMARK OFFICE
CERTIFICATE OF CORRECTION

PATENT NO. : 8,802,175 B2  
APPLICATION NO. : 13/001105  
DATED : August 12, 2014  
INVENTOR(S) : Qi et al.

Page 1 of 1

It is certified that error appears in the above-identified patent and that said Letters Patent is hereby corrected as shown below:

In the Claims:

In column 13, line 22, claim 11, replace -- 5% -- with -- 5 – 7% --.

Signed and Sealed this  
Eighteenth Day of November, 2014

Michelle K. Lee  
*Deputy Director of the United States Patent and Trademark Office*